United States Patent Office 3,421,006
Patented Jan. 7, 1969

3,421,006
PHOTOMETER WITH METER RESPONSE ADJUSTMENT COUPLED TO THE BRIDGE ADJUSTER
Erich Hahn, Dresden, Germany, assignor to Veb Pentacon Dresden Kamera- und Kinowerke, Dresden, Germany
Filed Oct. 31, 1966, Ser. No. 590,991
U.S. Cl. 250—210
Int. Cl. H01j 39/12
5 Claims The invention relates to an electric measuring appliance with bridge circuit, especially for photoelectric exposure meters, in which the tapping of the tuning resistor is variable by a sliding contact.

Known measuring appliances of this kind work with a constant feed voltage in the entire measurement range. Because the measuring bridge is many times more sensitive in the middle measurement range than in the lower or upper part of the overall measurement range, the constancy of the feed voltage has the result that in the middle measurement range the galvanometer pointer is deflected very far even on very slight variations of the measured value. The great unrest of the galvanometer pointer caused by this renders the production of the bridge equilibrium difficult. Moreover due to the continuous striking of the galvanometer pointer against the deflection limitation there is danger of damage to the galvanometer.

The problem of the invention is the avoidance of the above disadvantages by a reduction of the sensitivity of the bridge in the middle measurement range.

According to the invention this is achieved due to the fact that the sliding contact is coupled with the potentiometer slider of a voltage divider which varies the feed voltage of the bridge circuit.

The potentiometer slider is preferably adjustable by means of a control cam coupled with the sliding contact, and the control cam is formed as a control cam arranged symmetrically of the adjustment range of the potentiometer slider. According to another embodiment of the invention the voltage divider is connected with its two ends to one pole of the battery and with its centre tapping through a resistor to the other pole of the battery. One branch of the bridge circuit expediently comprises a photoelectric resistor, while the feed voltage of the bridge is variable in dependence upon the setting members for diaphragm, exposure time, film sensitivity, etc., which influence the tuning resistor. The details of the invention may be seen from illustrated and described examples of embodiment.

Figure 1:
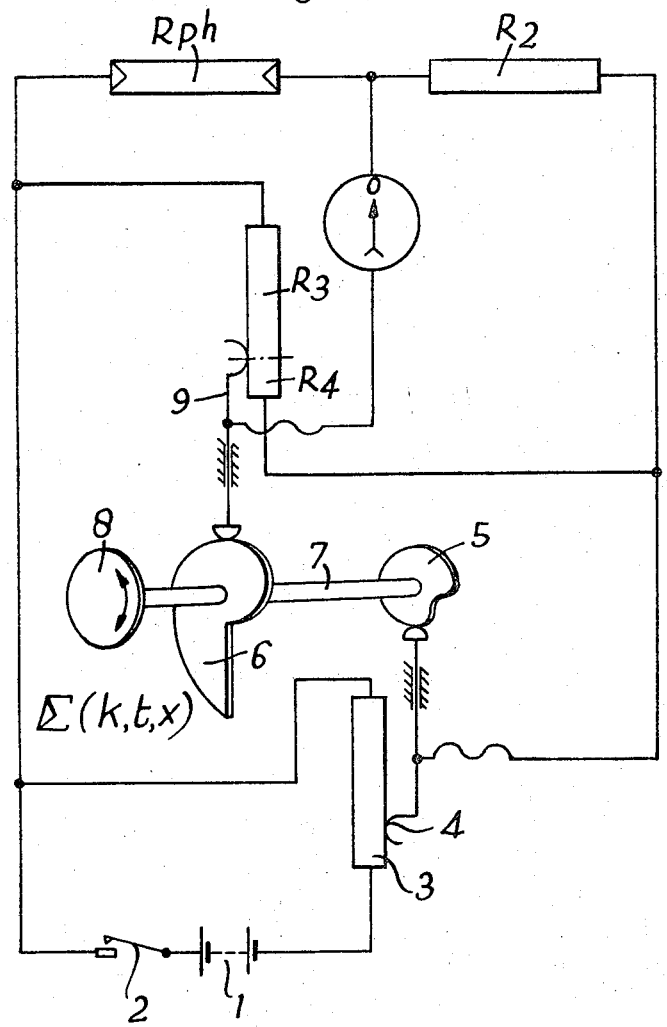
FIGURE 1 shows the voltage divider, which is influenceable through a control cam.

Across the voltage source 1, which can be switched on by a switch 2, there is connected a voltage divider 3 (see FIGURE 1), the potentiometer slider 4 of which is controlled by a cam disc 5 formed as control cam. The cam disc 15 is mounted, in common with a tuning cam 6 for the control of the sliding contact 9 for the resistors $R_3$ and $R_4$ of the bridge, on a spindle 7. This spindle 7 is coupled with a setting member 8, which represents the drive output of a totalling gearing for the introduction of the exposure factors diaphragm aperture K, exposure time $t$ and further factors $x$ such as film sensitivity and filter factor.

The resistors $R_3$ and $R_4$ permit of adapting the bridge in the case of different lighting intensities and different values of the photoelectric resistance $R_{ph}$ dependent thereon, by rotation of the spindle 7. In this case the control cam 5 for the voltage divider and the tuning cam 6 are rotated by the common spindle 7, so that a variation of the feed voltage ensues with the tuning of the bridge. The feed voltage applied to the bridge is here so controlled that the same bridge sensitivity occurs for every lighting intensity impinging upon the photoelectric resistance $R_{ph}$.

Figure 2:
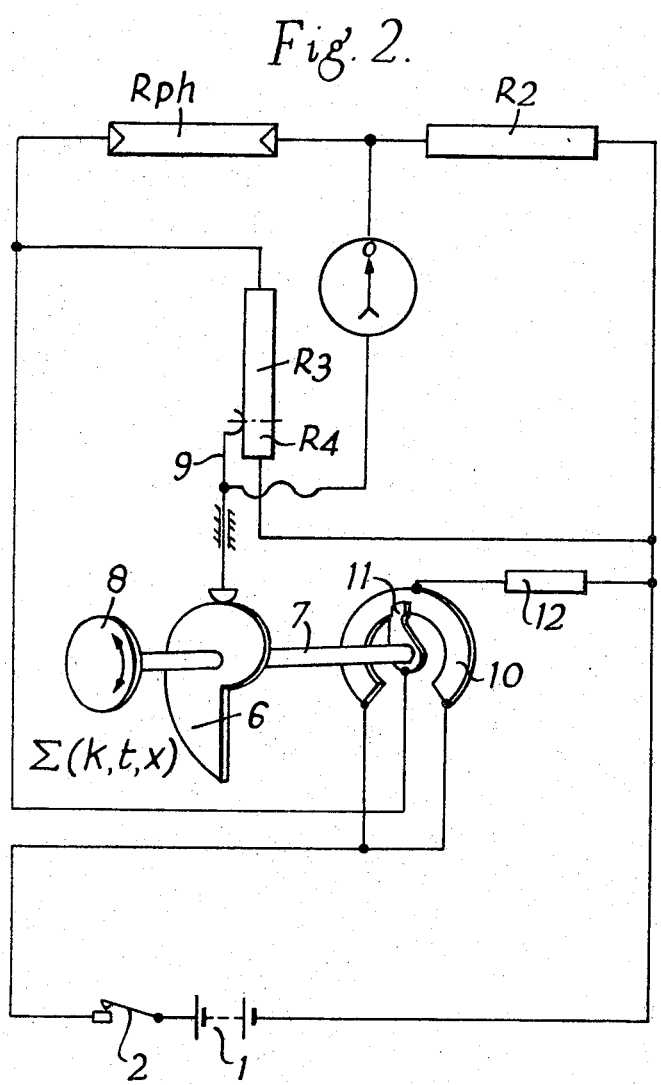
FIGURE 2 shows a voltage divider with centre tapping.

In a further example of embodiment (see FIGURE 2) the sliding contact 11, which slides on the voltage divider 10, is coupled with the spindle 7. The two ends of the voltage divider 10 are connected commonly to one pole of the battery 1, while the centre tapping of the voltage divider 10 is connected through a resistor 12 to the other pole of the battery 1.

The manner of operation is substantially the same as in the example of embodiment according to FIGURE 1. On rotation of the setting member 8 for the purpose of bridge balancing, the sliding contact 11 travels from one end of the voltage divider 10 to the other end, while at the two ends in each case the full voltage is taken from the battery but as the centre tapping there is taken a voltage reduced by the voltage drop on the resistor 12.

I claim:
1. An electric measuring appliance with bridge circuit, especially for photoelectric exposure meters, in which the tapping of the tuning resistor is variable by a sliding contact, wherein the sliding contact is coupled with the potentiometer slider of a voltage divider which varies the feed voltage of the bridge circuit.

2. An electric measuring appliance according to claim 1 wherein the potentiometer slider is adjustable by means of a control cam coupled with the sliding contact.

3. An electric measuring appliance according to claim 2, wherein the control cam is formed as a heart cam arranged symmetrically of the setting range of the potentiometer slider.

4. An electric measuring appliance according to claim 1, wherein the voltage divider is connected with its two ends to one pole of the battery and with its centre tapping through a resistor to the other pole of the battery.

5. An electric measuring appliance according to claim 1, wherein one branch of the bridge circuit comprises a photoelectric resistance and the feed voltage of the bridge circuit is variable in dependence upon the setting members for diaphragm aperture, exposure time, film sensitivity, etc., which influence the tuning resistor.

References Cited

UNITED STATES PATENTS

| | | | |
|---|---|---|---|
| 2,431,899 | 12/1947 | Wolf et al. | 250—210 X |
| 2,772,598 | 12/1956 | Hotine | 88—23 |
| 3,218,917 | 11/1965 | Foersterling et al. | 88—23 |
| 3,231,745 | 1/1966 | Doubek et al. | 250—210 |
| 3,238,443 | 3/1966 | Julie | 324—98 X |

JAMES W. LAWRENCE, *Primary Examiner.*

C. R. CAMPBELL, *Assistant Examiner.*

U.S. Cl. X.R.

88—23; 324—98